(12) United States Patent
Montgomery et al.

(10) Patent No.: US 12,314,227 B2
(45) Date of Patent: *May 27, 2025

(54) FORENSIC FILE SERVICE (71) Applicant: Code42 Software, Inc., Minneapolis, MN (US)

(72) Inventors: Christopher Michael Montgomery, Blaine, MN (US); Peter John Lindquist, St. Paul, MN (US); Brent Aethon McCullough, Saint Paul, MN (US); Vijay Ramanathan, Eden Prairie, MN (US); Daniel Louis Sullivan, Denver, CO (US)

(73) Assignee: Code42 Software, Inc., Minneapolis, MN (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/382,621

(22) Filed: Oct. 23, 2023

(65) Prior Publication Data
US 2024/0054105 A1 Feb. 15, 2024

Related U.S. Application Data

(63) Continuation of application No. 16/360,273, filed on Mar. 21, 2019, now Pat. No. 11,822,514.

(51) Int. Cl.
*G06F 7/00* (2006.01)
*G06F 16/11* (2019.01)
(Continued)

(52) U.S. Cl.
CPC ........ *G06F 16/1734* (2019.01); *G06F 16/128* (2019.01); *G06F 16/13* (2019.01); *G06F 16/148* (2019.01); *G06F 16/212* (2019.01)

(58) Field of Classification Search
CPC .... G06F 16/1734; G06F 16/128; G06F 16/13; G06F 16/148; G06F 16/212; G06F 16/152
(Continued)

(56) References Cited

U.S. PATENT DOCUMENTS 9,086,917 B1 7/2015 Fitzgerald et al.
10,079,842 B1 9/2018 Brandwine et al.
(Continued)

OTHER PUBLICATIONS

"U.S. Appl. No. 16/360,273, Appeal Brief filed Oct. 18, 2021", 27 pgs.
(Continued)

*Primary Examiner* — Md I Uddin
(74) *Attorney, Agent, or Firm* — Schwegman Lundberg & Woessner, P.A.

(57) ABSTRACT

A system for forensic file services is configured to receive data indicative of operations executed on a filesystem element stored on a computing resource associated with a first tenant, to and adjust the data according to an indicated database schema. The system is also configured to store the adjusted data in a record of a partition of a database, where the partition configured to store a history of operations executed on filesystem elements of computing resources associated with the first tenant. The system is further configured to receive a search request to search the database and to execute the search request on a second partition of the database to identify one or more matching records. The system is additionally configured to provide the identified records in response to the search request.

15 Claims, 7 Drawing Sheets

(51) Int. Cl.
*G06F 16/13* (2019.01)
*G06F 16/14* (2019.01)
*G06F 16/17* (2019.01)
*G06F 16/21* (2019.01)

(58) Field of Classification Search
USPC .. 707/681, 825, 999.201, 999.204, E17.001, 707/E17.005; 726/4, 11, 26, 27, 28
See application file for complete search history.

(56) References Cited

U.S. PATENT DOCUMENTS

| | | | | |
|---|---|---|---|---|
| 10,148,675 | B1* | 12/2018 | Brandwine | ......... H04L 63/1425 |
| 10,515,212 | B1 | 12/2019 | Mcclintock et al. | |
| 2002/0152305 | A1 | 10/2002 | Jackson et al. | |
| 2009/0292745 | A1* | 11/2009 | Bose | ....................... G06F 16/27 |
| 2011/0145216 | A1* | 6/2011 | Subramanya | ....... G06F 16/1734 |
| | | | | 707/694 |
| 2014/0181047 | A1* | 6/2014 | Pawar | ................. G06F 11/1451 |
| | | | | 707/654 |
| 2017/0344618 | A1 | 11/2017 | Horowitz et al. | |
| 2018/0091559 | A1* | 3/2018 | Luger | ................... H04L 63/145 |
| 2018/0349385 | A1 | 12/2018 | Oliver et al. | |
| 2020/0301888 | A1 | 9/2020 | Montgomery et al. | |

OTHER PUBLICATIONS

"U.S. Appl. No. 16/360,273, Appeal Decision mailed Mar. 17, 2023", 18 pgs.

"U.S. Appl. No. 16/360,273, Examiner's Answer mailed Mar. 3, 2022", 11 pgs.

"U.S. Appl. No. 16/360,273, Final Office Action mailed Apr. 29, 2021", 39 pgs.

"U.S. Appl. No. 16/360,273, Non Final Office Action mailed Oct. 19, 2020", 35 pgs.

"U.S. Appl. No. 16/360,273, Notice of Allowance mailed Jul. 19, 2023", 9 pgs.

"U.S. Appl. No. 16/360,273, Notice of Non-Compliant Appeal Brief Received Oct. 22, 2021", 2 pgs.

"U.S. Appl. No. 16/360,273, Response filed Jan. 19, 2021 to Non Final Office Action mailed Oct. 19, 2020", 11 pgs.

"U.S. Appl. No. 16/360,273, Response Filed Nov. 22, 2021 to Notice of Non-Compliant Appeal Brief Received Oct. 22, 2021", 27 pgs.

IBM, "Partitioned Database Environments", [Online]. Retrieved from the Internet: <URL: https://www.ibm.com/docs/en/db2/11.5?topic=partitions-partitioneddatabase-environments>, (Oct. 20, 2022).

* cited by examiner

FORENSIC FILE SERVICE

PRIORITY APPLICATION

This application is a continuation of U.S. application Ser. No. 16/360,273, filed Mar. 21, 2019, the content of which is incorporated herein by reference in its entirety.

TECHNICAL FIELD

Embodiments of the present disclosure relate generally to computer filesystems, more particularly, but not by way of limitation, to monitoring filesystem usage.

BACKGROUND

Corporations, firms, and other institutions (hereinafter, "business entities") can manage distributed information technology infrastructures that provide computing resources to employees, clients, and other users. Such computing resources can include user computing devices, computing servers, or hosted or network-based computing environments and storage systems. Such computing resources can be configured with filesystems having filesystem elements that facilitate the storage, manipulation, and communication of large amounts of data. Insights into the security, utility, and efficiency of these computing resources and their associated filesystems can be obtained through analysis of operations performed with respect to filesystem elements of these resources.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The distributed information technology infrastructure of a business entity can enable the intellectual property of the organization to be conveniently accessed by remotely connected computing resources and by computing resources disposed within the brick and mortar boundaries of these organizations. This intellectual property can include the files, databases, software applications and other filesystem elements that is stored on these computing resources and in other computing environments associated with the business entity. Such intellectual property can be allocated and stored amongst thousands of filesystem elements, each of which can be subject to thousands of access operations each day. Such access operations can include operations to create, modify, view, or delete filesystem elements. Such access operations can also include operations, or sequences of operations, to copy or transfer files or other data from one storage device to another storage device. During the normal course of business, these operations can be executed by authorized user applications, operating systems, and other applications that generate or modifying filesystem elements. Forensic analysis of these operations can provide clues or other evidence as to the unauthorized access to, or the anomalous use of, the intellectual property of a business entity. In an example, records of these operation scan be analyzed to determine or trace the lineage of a filesystem element, such as by tracking a file as it is moved across disparate filesystems or as it is transferred from one user's computing environment to another. In another example, records of these operations can be analyzed to track filesystem element exfiltration events, such as the transfer of a file from one device or user to another device or user.

Traditional filesystem backup repositories can be used to support forensic analysis of operations executed on filesystem elements. These repositories, however, can include large compressed data records, such as filesystem images, reflecting snapshots of individual filesystems at specific points in time. Searching these records, such as to harvest data for forensic analysis, can be impractical due to the amount of time and the computing resources needed execute a searches across these records and across disparate repositories. Additionally, the data stored in these repositories can provide an incomplete view of the operations executed on a given filesystem element (e.g., these repositories typically only capture evidence of operations whose impact on a filesystem element persist at the end of a filesystem backup period). Accordingly, it can be impractical to use these repositories to support forensic analysis of filesystems or filesystem elements across the information technology infrastructure of some business entities.

Aspects of the present disclosure are directed to techniques (e.g., systems, methods, and machine-readable storage mediums) for providing forensic file services for one or more computing resources. Forensic file services can include techniques for capturing filesystem events, such as operations executed on filesystem elements and the filesystem artifacts of these operations. Forensic files services can also include techniques for processing filesystem events, such as to generate structured repositories that can be queried to gain insight in to filesystem element access patterns. Forensic files services can further include interfaces, analytical tools, and techniques for querying these repositories and identifying these patterns. The techniques described herein can overcome the previously mentioned deficiencies in the prior art.

In some examples of the present disclosure, data indicative of operations executed on a filesystem element can be received from a computing resource, such as an endpoint device (e.g., a user computing device), a computing server, or a network-based computing environment. The received data can include a set (e.g., one or more) of filesystem events captured by a monitoring application executing on the computing resource. A filesystem event can include any operation to create, read, modify, or delete a filesystem element. A filesystem event can also include any operation to copy or transfer a filesystem element from one computing resource to another computing resource, such as copying or moving a file to removable storage device. In some examples, a filesystem event can be derived from, or generated based on, operations that are indicative of, or included in, another filesystem event. A filesystem event that indicates that a filesystem element was copied or transferred to another computing resource can be derived from filesystem events or operations that create, read, modify, delete filesystem elements. A filesystem event can also include data indicative of artifacts associated with the operation, such as an identifier (e.g., a file name, and a file path) of filesystem elements operated on, other metadata associated with the filesystem element, the date and time the operation was executed, or a digital signature (e.g., a checksum) associated with the filesystem element after execution of the operation. A filesystem event an also include any other data or metadata associated with a computing resource or an operation executed on a filesystem element associated with a computing resource. The received data can then be adjusted according to an indicated database schema. The adjusting can include allocating the received filesystem event data to substantially parallel processing queues, such as based on an identifier of the computing resource that generated the filesystem event. The allocated filesystem event data can then be processed, such as by normalizing the filesystem event data to cause the data to conform to an indicated data structure. The processed filesystem event data be stored in a record of a partition of a database configured to store a history of operations executed on filesystem elements of computing resources associated with a specific tenant (e.g., a business entity).

In some examples of the present disclosure, a search request into the database storing a history of operations executed on filesystem elements of computing resources associated with a specific tenant can be received. The search request can include search query and a tenant identifier. The search query can be executed on a partition of the historical database that is configured to store operations executed on filesystem elements of computing resources associated with the tenant by the tenant identifier. Records, such as filesystem event data, satisfying the search query can then be provided.

Figure 1:
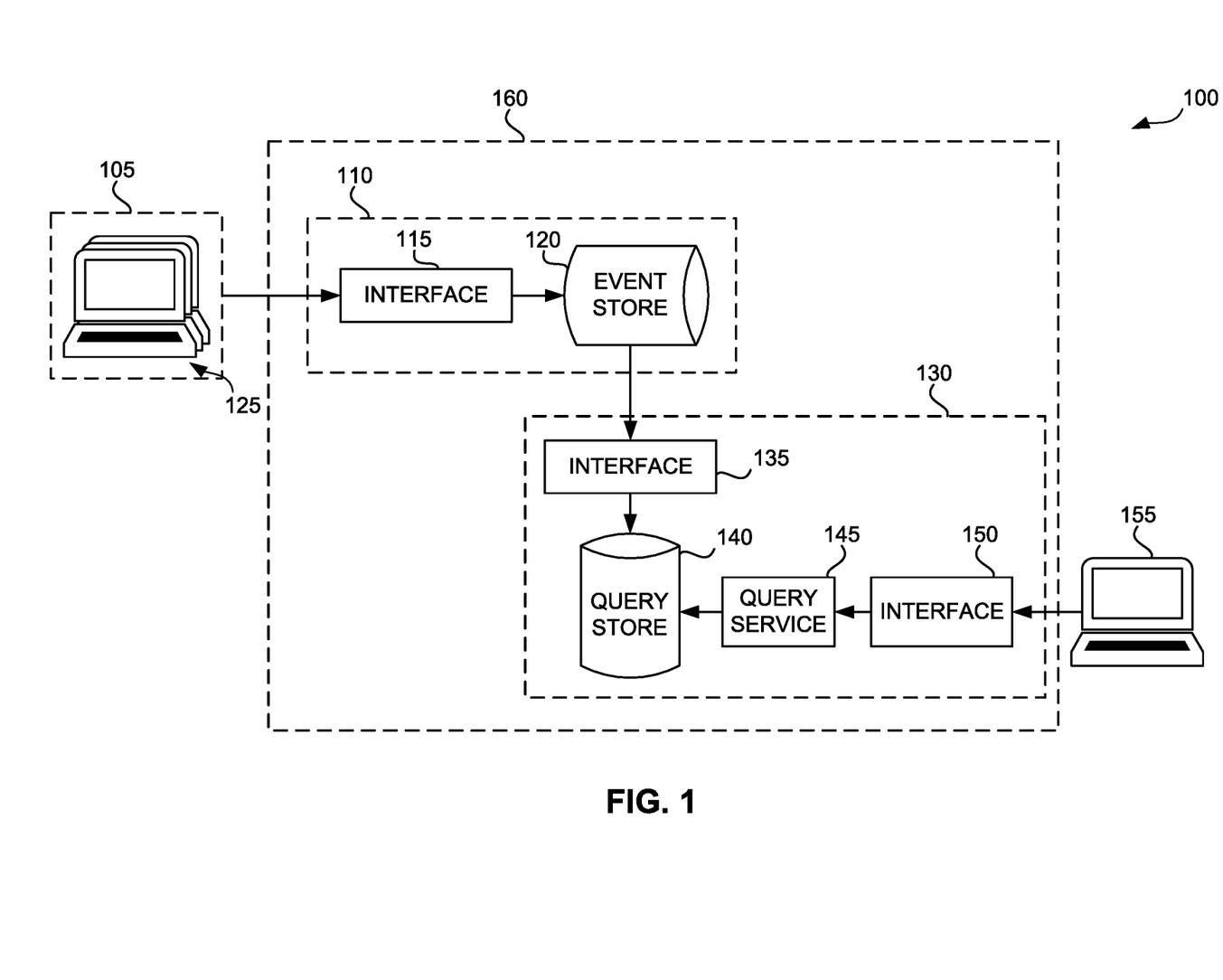
FIG. 1 illustrates a block diagram of an example of an environment and a system for forensic file services, according to some examples of the present disclosure.

Turning now to the figures, FIG. 1 illustrates a block diagram of an example of an environment 100 and system 160 for forensic file services, according to some examples of the present disclosure. The environment 100 can include computing resources 125, the system 160, and analytical computing resources 155.

The computing resources 125 can include any computing system (e.g., endpoint devices such as user computing device, computing servers, or network-based or hosted computing environments) configured with one or more software application to detect operations executed on a filesystem element and generate filesystem events based on the detected operations. The computing resources 125 can also include a computing environment, or a partition of a computing environment, that is allocated to a user of computing system. Each computing resource 125 can be associated with a distinct tenant 105. A tenant 105 can include an individual user operating as their own enterprise, or a business entity having one or more users or clients. A tenant 105 can be associated with one or more computing resources 125. Generally, computing resources 125, and by association, filesystem event data, are not shared between different tenants 105.

The system 160 can receive a set of one or more filesystem events, process and store the events in a local or distributed repository, and service search queries in to such repositories. The system 160, or the components of the system, can include one or more computing resources, such as a computing server, or a network-based or hosted computing environment. Such components can include an event storage component 110 and the forensic search component 130.

The event storage component 110 can receive filesystem events though the interface 115 and allocate the received events to one or more processing queues in the event store 120. The interface 115 can include an applications program interface (API) for interfacing with software scripts, utilities, applications, or other software modules, such as to receive filesystem events from the computing resources 125.

In some examples, an interface 115 can enable the system 160 to remotely communicate with, and to receive filesystem events from, a filesystem monitoring application executing on the computing resources 125. The interface 115 can also include software components for instantiating and executing one or more processes, such as asynchronously executing or substantially parallel processes, to preprocess the received filesystem events and allocate the preprocessed events to one or more processing queues. Such preprocessing can include determining a source of a filesystem event (e.g., the network identifier of the computing resource that generated the event). Such preprocessing can also include conditioning (e.g., adding contextual information) received filesystem event data for further processing by the system 160.

Allocating preprocessed events to one or more processing queues can include identifying a processing queue for a filesystem event and storing the event in a data structure associated with the identified processing queue. In some examples, a processing queue for a filesystem event can be identified based on the network identifier of the computing resource that generated the filesystem event or based on the utilization of a processing queue allocated to process the filesystem event. Generally, all filesystem events that are generated by a given computing resource are allocated to the same processing queue. In some situations, however, a filesystem event can be allocated to a new processing queue if the processing queue designated for the filesystem event is over utilized, or if the system 160 has excess processing capacity.

The event store 120 can include one or more processing queues (e.g., a data structure including an ordered list of filesystem events) that serve as temporary storage for filesystem events. The processing queues of the event store 120 can be dynamically adjusted, such as in response to the rate at which filesystem events are added to the queue and the rate queued events are consumed by the forensic search component 130. Dynamically adjusting a processing queue can include adding a new processing queue to the event store 120 or changing, at runtime, the amount of memory or processing resources allocated to an existing processing queue. In an example, a new processing queue can be dynamically allocated to store filesystem events in response to a utilization of a first processing queue exceeding a threshold utilization.

The forensic search component 130 can include an interface 135, query store 140, query service 145, and interface

150. The interface 135 can include software components for instantiating and executing one or more processes, such as asynchronously executing processes or substantially parallel processes, to retrieve and process sets of one or more filesystem events from the event store 120. Each of the one or more processes can be configured to retrieve and process data from a single processing queue. Accordingly, each process can maintain information for processing its associated queue. Such information can include pointers to the next item in the processing queue to be processed, or indicators of any splits or adjustments to the processing queue.

Processing a filesystem event can include normalizing the filesystem event data, such as to cause the filesystem event data to conform to a structure that matches, or that is optimized for, a specific database schema. In an example, such normalization can include flattening nested tables included in filesystem event in to a single level table having fields indicated by the database schema. In another example, such normalization can include modifying data included in filesystem event to conform with the database schema. In some situations, such modifying can include generating data for a filesystem event when a filesystem event does not include sufficient data to normalize the event. In some examples, a database schema can include a field to store a digital signature of a filesystem element after the filesystem element (e.g., a hash of the contents of a filesystem element) is operated on. However, when a filesystem event is generated based on a delete operation, a hash of the resulting filesystem element cannot be generated because the filesystem element no long exists. In this scenario, the filesystem event data can be modified to include the last known digital signature of the deleted filesystem element. This last known digital signature can be obtained by executing a query in to the query store 140.

Each of the one or more processes generated by the interface 135 can batch and store sets of one or more normalized filesystem events in the query store 140. In some examples, each normalized event can be stored in a database partition allocated to tenant 105 associated with a computing resource 125 that generated the basis filesystem event.

The query store 140 can include a shared database of normalized filesystem events. The database can be shared between one or more tenants, such that filesystem events generated by computing resources of a given tenant is stored in a database partition that is allocated to that tenant. In some examples, a database partition of the query store 140 that is allocated to a first tenant cannot be accessed by a second tenant without authorization from the first tenant.

The query service 145 can include one or more database management applications for managing and servicing queries into the query store 140.

The interface 150 can include one or more applications for providing a web server or software interface (e.g., a scripting interface), such as for servicing or executing queries in to the query store 140. In some examples, the interface 150 can generate a webpage input form having one or more selectable fields for forming and submitting a query into the query store 140. The fields of the input form can include references to any filesystem event data or metadata stored query store 140 (e.g., usernames, hostname tenant or computing resource names, filesystem event observation dates, event type, and source; filesystem element filename, file path, hash, etc.). In other examples, the interface 150 can generate a webpage or script to render results of executing a received query in to the data store 150 on a requesting computing resource.

In an example, the forensic search service 130 can include can include a smart proxy that is configured route requests from either the query service 145 or the event store event store 120 to one or more query store 140.

Returning to the description of the environment 100, the analytical computing resources 155 can include any computing resource configured to interface with the system 160, such as to execute queries against the filesystem events stored in the query store 140. In an example, analytical computing resources 155 can include one or more of the computing resources 125. The analytical computing resources 155 can be operated by a user (e.g., an employee) associated with the tenant 105, such as to identify anomalous patterns in the access of filesystem elements of computing resources 125. Identifying such anomalous access patterns can detect or identify users that access, copy, update, or transfer files or other intellectual property, without permission or in an unauthorized manner. In other examples, the analytical computing resources 155 can be associated with an entity to whom the tenant 105 has delegated authority to execute queries against filesystem events generated by the computing resources 125. In another example, the analytical computing resources 155 can be included in the system 160, such as a component of the forensic search component 130.

Generally, the analytical computing resources 155 can include computing devices, computing environments, and software applications (e.g., web applications, scripting environments, or analytical tools) for analyzing the filesystem event data stored in the query store 140 to identity filesystem element access patterns or to provide a file providence service. Providing a file providence service can include analyzing records of filesystem events stored in the query store 140 to determine the lineage of a filesystem element, such as by tracking a file when it is moved form one computing resource to another computing resource. In an example, filesystem event data generated by a first computing resource and a second computing resource can be analyzed to determine whether a file was copied or moved from the first computing resource to the second computing resource. Such analysis can include analyzing (e.g., comparing) metadata included in filesystem events, such as to determine whether a file stored on a first computing resources has the same digital signature, filename, or file path as another filed stored on the second computing resource. Such analysis can determine the lineage of a filesystem element even when some metadata associated with the filesystem element is modified. As an example, the digital signatures of filesystem elements can be analyzed to determine whether a file was copied from a first computing resource to a second computing resource even when the filename of the is changed. In some examples, such analysis can also be used to track or determine operations executed on a filesystem element after the filesystem element is moved from one computing resource to another computing resource.

In an example, the analytical computing resources 155 can only execute queries against the query store 140 to access filesystem event data of a tenant to which the analytical computing resources belongs or a tenant that has authorized that analytical computing resources to access such data. The system 160 can enforce this security measure by receiving from the analytical computing resources 155, in association with the query or search request into the query store 140, a token that authorizes the analytical computing resources to access the filesystem event data of an indicated tenant. In some examples, the token can be encrypted or otherwise digitally signed by the authorizing tenant, or by an entity associated with the authorizing tenant.

Figure 2:
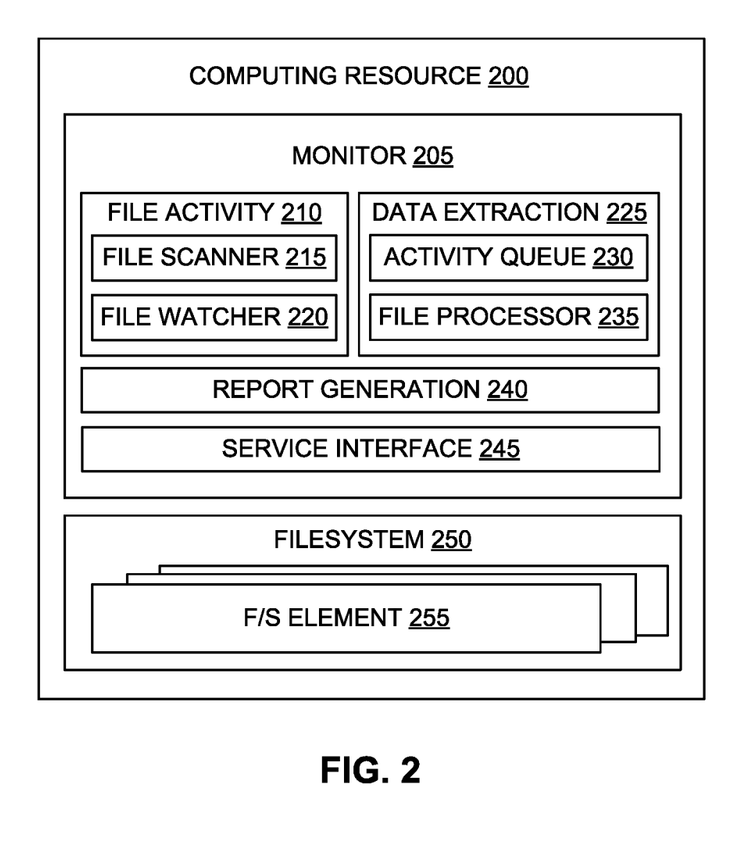
FIG. 2 illustrates a block diagram of an example of a computing resource associated with a system for providing forensic files services, according to some examples of the present disclosure.

FIG. 2 illustrates a block diagram of an example of a computing resource 200 associated with a system for forensic files services, according to some examples of the present disclosure. The computing resource 200 can be an example of one or more of the computing resources 125 (FIG. 1), while the system can be an example of the system 160 (FIG. 1). In some examples, the computing resource 200 can be a network endpoint device, such as a user computing device. In other examples, the computing resource 200 can be a network-based or hosted computing environment. The computing resource 200 can include a monitoring application 205, and a filesystem 250 having filesystem elements 255. The monitoring application 205 can be a custom programmed software application that is configured to detect operations executed on filesystem elements 255 and generate filesystem events based on the detected operations. The filesystem events can be generated based on any operation that creates, modifies, or deletes a filesystem element. In some examples, a filesystem event can be generated in response to a user copying or moving a filesystem element from one computing resource to another computing resource. In other examples, a filesystem event can be generated after the contents of a file, or metadata associated with a file, is changed, such as by a user or by a process executing on the computing resource 200.

The monitoring application 205 can include file activity component 210 and data extraction component 225. File activity component 210 can be configured with file scanner 215 and file watcher 220, such as to detect any computing operations that are executed on the filesystem element 255. The file scanner 215 can scan, such as at an indicated interval, the filesystem 250 to identify filesystem elements that have changed since a previous scan, when the file watcher 220 can continually monitor the filesystem to detect filesystem elements that have changed in real time. Information identifying changed filesystem elements can be provided to data extraction component 225, which can process the identified filesystem elements using activity queue 230 and file processor 235 to generate one or more filesystem events based on with the changed filesystem elements. In some examples, the information identifying a changed filesystem element can include an indicator of the type of operation executed on the filesystem element 255 to cause the change to the filesystem element. In other examples, the information identifying a changed filesystem element can include an identifier of the filesystem event, and the file processor 235 can use the identifier to locate and analyze the stored filesystem element determine the type operation that was executed on the filesystem element 255 to cause the identified changes. Generally, the file processor 235 can access a changed filesystem element, calculate a digital signature for the filesystem element, and collect filesystem element metadata associated with the filesystem element and an operation executed on the filesystem element. This information can be used to generate a filesystem event and provided to report generation component 240. Report generation component 240 can aggregate filesystem events in a report data structure, such as an XML or JSON data structure, and transmit the result to the system 160 (FIG. 1) using network interface service 245.

Figure 3:
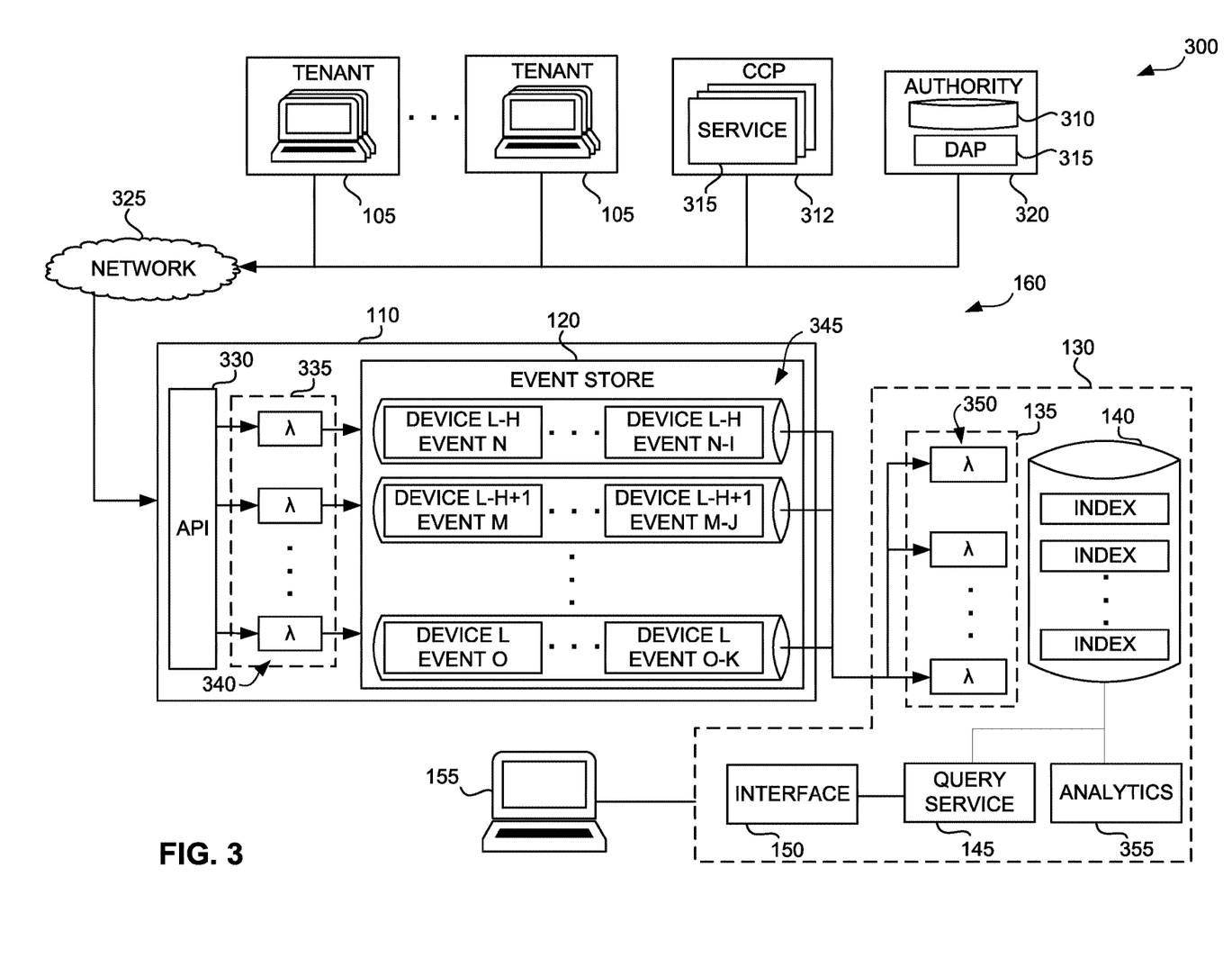
FIG. 3 illustrates block diagram of example of an environment and a system for forensic file services, according to some examples of the present disclosure.

FIG. 3 illustrates block diagram of example of an environment 300 and a system 160 for forensic file services, according to some examples of the present disclosure. The environment 300 can be a more detailed example of the environment 100 (FIG. 1). In addition to the previously discussed components of the environment 100, the environment 300 can include cloud computing platform 312, an authority server 320, a data communication network 325.

The cloud computing platform 312 can be an example of a tenant 105, or a computing resource 125 associated with a tenant. In some examples, the cloud computing platform 312 can provide one or more services 315. A service 315 can include a network-based or hosted computing environment, such as a virtualized operating system or a network-based storage resource.

The authority server 310 can include one or more computing resources, such as a computing server, that is configured to generate or store snapshots of tenants or computing resources that are registered, connected, or otherwise associated with the system 160. A snapshot can include data indicative of a human readable identifier of a tenant or a computing resource (e.g., a name of a tenant, or a hostname of a computing resource) and a status of the tenant or computing resource (e.g., data indicating whether the tenant or computing resource is currently active). In some examples, a snapshot can be packaged in a data structure similar to a filesystem event. Data used to generate a snapshot can be captured by a process executing on the authority server 320, such as a device authority puller application (DAP) 315. Such data can be accumulated in a database 310 and provided to the system 160 in batched sets of one or more snapshots. The batched set of one or more snapshots can be processed by the system 160 in substantially the same way that sets of filesystem events are processed through the system 160. In some examples, however, such snapshots can be processed by the system 160 such that snapshots of all tenants or computing resources are allocated to, or processed through, the same processing queue in the event store 120. Additionally, processed snapshots for all tenants or computing resources can be stored in a single partition in the query store 140. A snapshot can be used to augment the results of search requests or queries into the event store 140, such as to cause the results to include human readable tenant and computing resource identifiers.

The devices or computing resources in the environment 300 can communicate with each using the data communication network 325. The data communication network 325 can include any suitable data communication network, such as a Local Area Network, a cellular network, a Personal Area Network, a Wide Area Network, or the internet.

The storage event component 110, as illustrated in FIG. 3, can include an API 330 and asynchronous or substantially parallel executing processes 335. In some examples, the asynchronous or substantially parallel executing processes 335 can include one or more anonymous function literals. The storage event component 110, as illustrated in FIG. 3, can also include processing queues 345 of the event store 120. As described during the discussion of event store 120, each processing queue 345 can be associated with a single computing resource, such as computing resource L-H, and can provide temporary storage for an ordered list one or more filesystem events, such as filesystem event N through filesystem event N-I, generated by the computing resource.

The forensic search component 130, as illustrated in FIG. 3, can include an interface 135 having a set of one or more asynchronous or substantially parallel executing processes 350. In some examples, the asynchronous or substantially parallel executing processes 335 can include one or more anonymous function literals. The forensic search component 130, as illustrated in FIG. 3, can also include analytics component 355. Analytics component 355 can include computing resources associated with the system 160 and configured to execute search queries against the filesystem events stored in the query store 140. The one computing resources can also be configured to analyze the results of the search query to identify anomalous access to filesystem elements of computing resources associated with the tenants 105 or the cloud computing platform 312.

Figure 4:
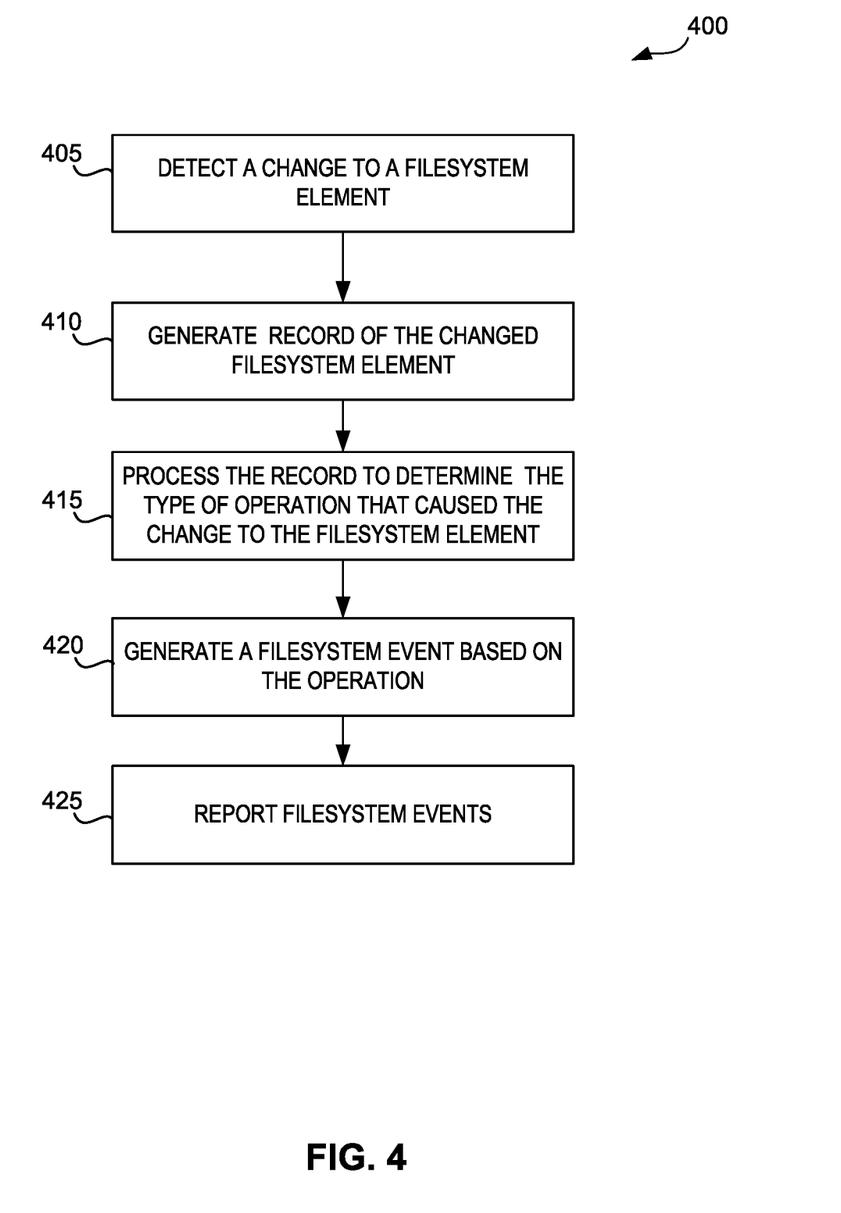
FIG. 4 illustrates an example of a process for operating a computing resource to generate filesystem events for a system for forensic files services, according to some examples of the present disclosure

FIG. 4 illustrates an example of a process 400 for operating a computing resource to generate filesystem events for a system for forensic files services, according to some examples of the present disclosure. The process 400 can be executed by an application, such as the monitor application 205, executing on computing resource, such as the computing resource 125, 200, or the service 315. At operation 405, a filesystem can be monitored to detect a change to a filesystem element of the computing resource. At operation 410, a record of the detected change can be generated. The record can include an identifier of the filesystem element or any other metadata associated with the filesystem element or the operation that caused the change. At operation 415, the record can be processed, such as to determine the type operation that caused the change to the filesystem element. At 420, a filesystem event can be generated based on the determined operation. At operation 425 one or more filesystem events can be batched and transmitted, or reported, to the system for forensic file services.

Figure 5:
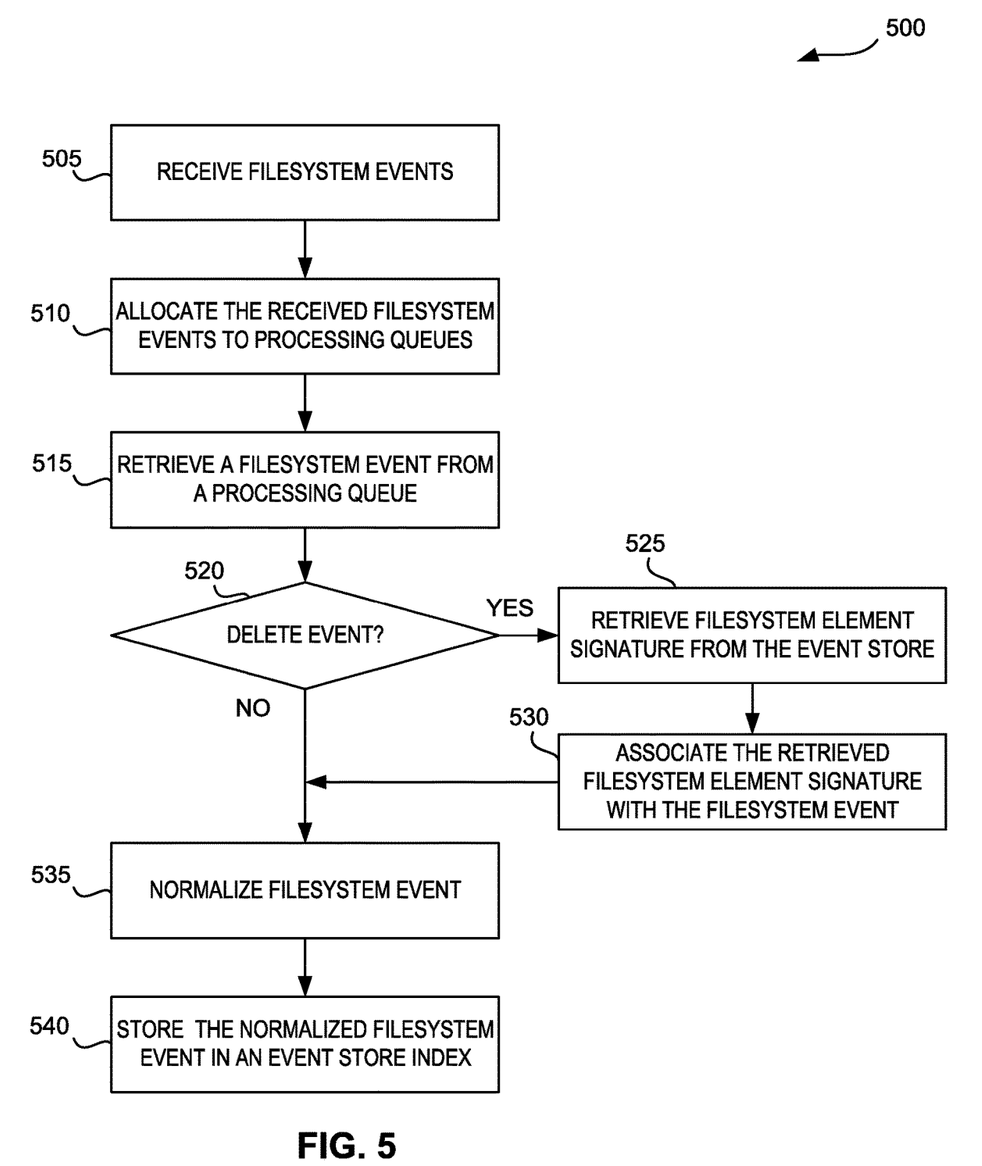
FIG. 5 illustrates an example of a process for operating a system for forensic files services, according to some examples of the present disclosure.

FIG. 5 illustrates an example of a process 500 for operating a system for forensic file services, according to some examples of the present disclosure. The process 500 can be executed by a system forensic file services, such as the system 160 (FIG. 1), to allocated filesystem events to a database of filesystem events, such as the event store 140 (FIG. 1). At operation 505 one or more filesystem events can be received, such as from a computing resource associated with a tenant of the system. At operation 510, the filesystem events can be processed, such as by adding contextual information to the events. Such contextual information can include information that can be used to identify a source of the filesystem events, or to identify a destination processing queue for the filesystem events. The processed events can then be allocated to one or more processing queues, as described herein. At operation 515 a batch of one more events can be retrieved from a selected processing queue. At operation 520, it can be determined whether a selected filesystem event was generated based on a delete operation. When the selected filesystem event was not generated based on a delete operation, the selected filesystem event can be normalized and stored in an index of an event store, as shown in operations 535 and 540. At operation 525, when the selected filesystem event was generated based on a delete operation, a digital signature associated with the filesystem element before the filesystem element was deleted can be retrieved from the event store. At operation 530, the retrieved signature can be associated with, or used to augment, the selected filesystem event, as described herein. The augmented filesystem event can then be normalized and stored as indicated by operations 535 and 540.

In some examples, the process 500 can be executed to prune the event store by removing stored filesystem events that are older than a threshold date. Such pruning, however, can include preserving, or not removing, a filesystem event that is the only stored filesystem event associated with a filesystem element of a given computing resource. Other techniques criteria, or algorithms, can be used to prune the event store.

Figure 6:
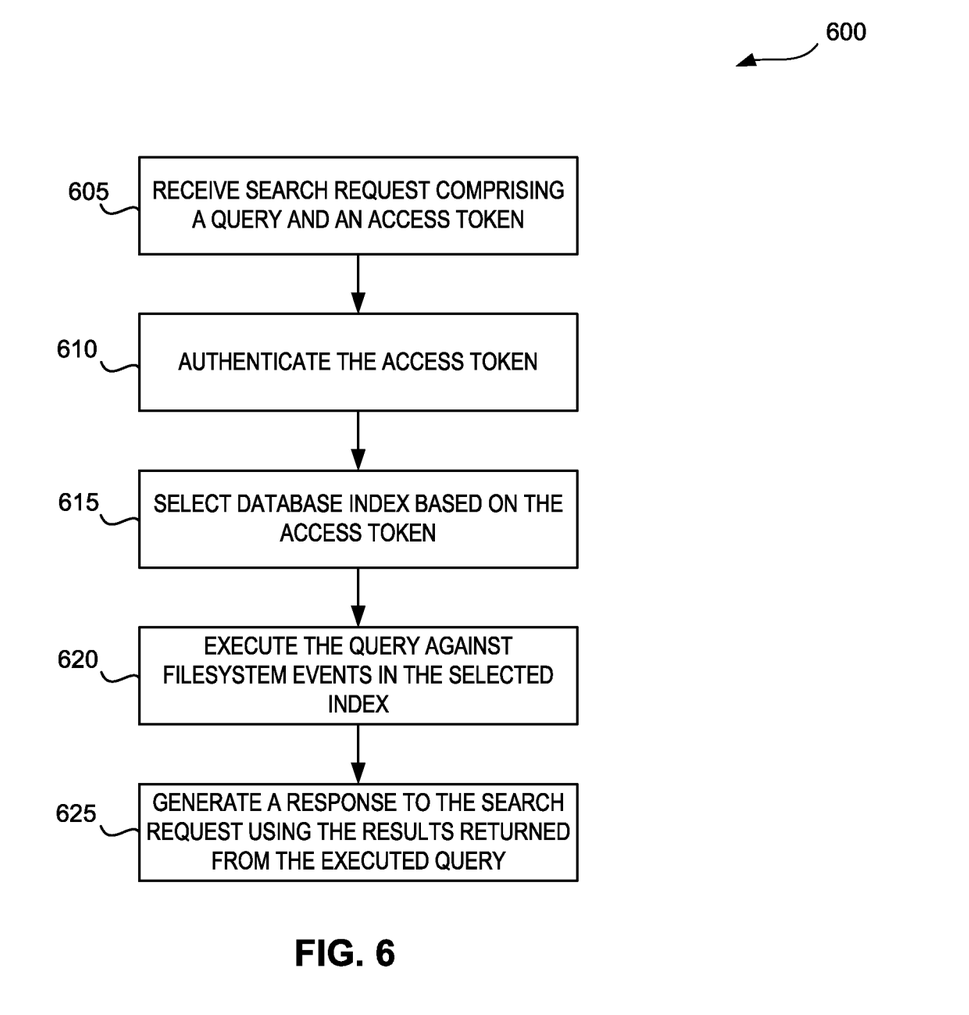
FIG. 6 illustrates an example of a process for processing a query in to a system for forensic files services, according to some examples of the present disclosure.

FIG. 6 illustrates an example of a process 600 for processing a query in to a system for forensic files services, according to some examples of the present disclosure. The process 600 can be executed by one or more components of the system 160, such as the forensic search component 130, to service or process queries against a database of filesystem events, such as the event store 140 (FIG. 1). At operation 605, a search request can be received, such as from a software scripting interface or a webpage. The search request can include a token and a search query in to the event store. The token can indicate that a computing resource executing the request is authorized to access an index or partition of the event store that is the target of the search request. At operation 610, the token can be authenticated, such as by using one or more cryptographic authentication algorithms, such as public key encryption. At operation 615, the targeted index of the event store can be identified, or selected, based on the authenticated token. At operation 620, the search query can be executed against filesystem events stored in the selected event store index to identify one or more matching records. At operation 625, a response to the search request can be generated using the one or more matching records.

In some examples, the process 600 can be executed to use the identified records to identify anomalous usage of a computing resource and to provide an indication of the identified anomalous usage.

Figure 7:
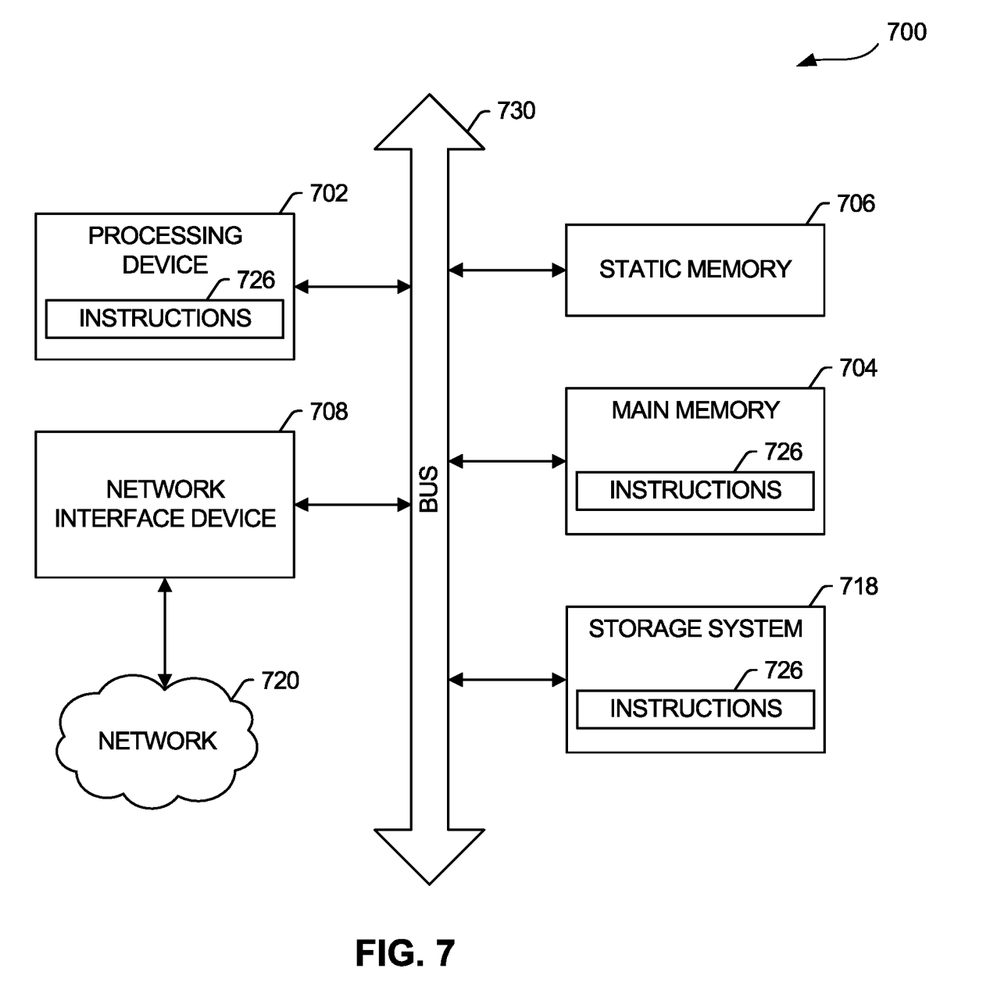
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine in the form of a computer system within which a set of instructions may be executed for causing the machine to perform any one or more of the methodologies discussed herein, according to an example embodiment. The computer system 700 can be an example of the any of the computing resources discussed herein.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that may, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system, a host system, etc.) 700 can include a processing device 702 (e.g., a hardware processor, a central processing unit (CPU), a graphics processing unit (GPU), a hardware processor core, or any combination thereof, etc.), a main memory 704 (e.g., read-only memory (ROM), dynamic random-access memory (DRAM) such as synchronous DRAM (SDRAM) or Rambus DRAM (RDRAM), etc.), a static memory 706 (e.g., static random-access memory (SRAM), etc.), and a storage system 718, some or all of which can communicate with each other via a communication interface (e.g., a bus) 730.

The processing device 702 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 can be configured to execute instructions 726 for performing the operations and steps discussed herein. The computer system 700 can further include a network interface device 708 to communicate over a network 720.

The storage system 718 can include a machine-readable storage medium (also known as a computer-readable medium) on which is stored one or more sets of instructions 726 or software embodying any one or more of the methodologies or functions described herein. The storage system 718 can also include reset logic component 728, which can be configured according to the techniques and methodologies of the present disclosure, such as perform the operations of the reset logic component 145. The instructions 726 can also reside, completely or at least partially, within the main memory 704 or within the processing device 702 during execution thereof by the computer system 700, the main memory 704 and the processing device 702 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 700 can further include a display unit, an alphanumeric input device (e.g., a keyboard), and a user interface (UI) navigation device (e.g., a mouse). In an example, one or more of the display unit, the input device, or the UI navigation device can be a touch screen display. The machine a signal generation device (e.g., a speaker), or one or more sensors, such as a global positioning system (GPS) sensor, compass, accelerometer, or one or more other sensor. The machine 700 can include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 726 (e.g., software, programs, an operating system (OS), etc.) or other data are stored on the storage system 718 can be accessed by the main memory 704 for use by the processing device 702. The main memory 704 (e.g., DRAM) is typically fast, but volatile, and thus a different type of storage than the storage system 718 (e.g., an SSD), which is suitable for long-term storage, including while in an "off" condition. The instructions 726 or data in use by a user or the machine 700 are typically loaded in the main memory 704 for use by the processing device 702. When the main memory 704 is full, virtual space from the storage system 718 can be allocated to supplement the main memory 704; however, because the storage system 718 device is typically slower than the main memory 704, and write speeds are typically at least twice as slow as read speeds, use of virtual memory can greatly reduce user experience due to storage system latency (in contrast to the main memory 704, e.g., DRAM). Further, use of the storage system 718 for virtual memory can greatly reduce the usable lifespan of the storage system 718.

The instructions 724 can further be transmitted or received over a network 720 using a transmission medium via the network interface device 708 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 708 can include one or more physical jacks (e.g., Ethernet, coaxial, or phone jacks) or one or more antennas to connect to the network 720. In an example, the network interface device 708 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

What is claimed is:

1. A system for forensic file services, the system comprising:
    a computing device, comprising a hardware processor and a memory, the memory, storing instructions, which when executed by the hardware processor, causes the system to perform operations comprising:
    receiving, over a network and from a monitoring application executing on a computing resource associated with a first tenant for forensic file services, data describing a filesystem element event corresponding to a particular filesystem element on the computing resource associated with the first tenant, the filesystem element event data describing a change to the particular filesystem element on a filesystem of the computing resource associated with the first tenant, and the filesystem element data including metadata of the particular filesystem element;
    allocating the filesystem element event data to one of a plurality of parallel processing queues based upon an identifier of the computing resource;
    determining that the filesystem element event corresponds to a deletion event;
    responsive to determining that the filesystem element event corresponds to the deletion event, searching an event database for a last filesystem element event corresponding to that filesystem element and extracting a filesystem element signature including a hash of content of the particular filesystem element;
    adding the filesystem element signature to the filesystem element event data to create enhanced filesystem element event data;
    store the enhanced filesystem element event data in a database record of the event database in a partition configured to store a history of filesystem element events of a plurality computing resources associated with the first tenant;
    receive a search request from a second computing device to search the event database, the search request comprising a search query and a tenant identifier of a second tenant;
    execute the search query on a second partition of the event database to identify records that satisfy the search query, the second partition configured to store a history of filesystem element events of a plurality of computing resources associated with the second tenant; and
    provide the identified records in response to the search request.

2. The system of claim 1, wherein the metadata of the particular filesystem element comprises at least one of: a filename, a filepath, a timestamp, a file size, a checksum, or a file type.

3. The system of claim 1, wherein allocating the filesystem element event data to one of the plurality of parallel processing queues comprises allocating the filesystem element event data to a processing queue based on a network identifier of the computing resource.

4. The system of claim 1, wherein the operations further comprise: receiving data describing a second filesystem element event corresponding to a second filesystem element on a second computing resource associated with the first tenant; and allocating the second filesystem element event data to a second one of the plurality of parallel processing queues based upon an identifier of the second computing resource, wherein the second filesystem element event and the filesystem element event are processed in parallel.

5. The system of claim 1, wherein the operations further comprise: pruning the event database by removing records older than a threshold time period.

6. The system of claim 5, wherein pruning the event database comprises retaining a record when it is an only record corresponding to a particular filesystem element.

7. A method comprising:
receiving, over a network and from a monitoring application executing on a computing resource associated with a first tenant for forensic file services, data describing a filesystem element event corresponding to a particular filesystem element on the computing resource associated with the first tenant, the filesystem element event data describing a change to the particular filesystem element on a filesystem of the computing resource associated with the first tenant, and the filesystem element data including metadata of the particular filesystem element;
allocating the filesystem element event data to one of a plurality of parallel processing queues based upon an identifier of the computing resource;
determining that the filesystem element event corresponds to a deletion event;
responsive to determining that the filesystem element event corresponds to the deletion event, searching an event database for a last filesystem element event corresponding to that filesystem element and extracting a filesystem element signature including a hash of content of the particular filesystem element;
adding the filesystem element signature to the filesystem element event data to create enhanced filesystem element event data;
storing the enhanced filesystem element event data in a database record of the event database in a partition configured to store a history of filesystem element events of a plurality computing resources associated with the first tenant;
receiving a search request from a second computing device to search the event database, the search request comprising a search query and a tenant identifier of a second tenant;
executing the search query on a second partition of the event database to identify records that satisfy the search query, the second partition configured to store a history of filesystem element events of a plurality of computing resources associated with the second tenant; and
providing the identified records in response to the search request.

8. The method of claim 7, wherein the metadata of the particular filesystem element comprises at least one of: a filename, a filepath, a timestamp, a file size, a checksum, or a file type.

9. The method of claim 7, wherein allocating the filesystem element event data to one of the plurality of parallel processing queues comprises allocating the filesystem element event data to a processing queue based on a network identifier of the computing resource.

10. The method of claim 7, further comprising: receiving data describing a second filesystem element event corresponding to a second filesystem element on a second computing resource associated with the first tenant; and allocating the second filesystem element event data to a second one of the plurality of parallel processing queues based upon an identifier of the second computing resource, wherein the second filesystem element event and the filesystem element event are processed in parallel.

11. The method of claim 7, further comprising: pruning the event database by removing records older than a threshold time period.

12. The method of claim 11, wherein pruning the event database comprises retaining a record when it is an only record corresponding to a particular filesystem element.

13. A machine-readable medium, storing instructions, which when executed by a machine, cause the machine to perform operations comprising:
receiving, over a network and from a monitoring application executing on a computing resource associated with a first tenant for forensic file services, data describing a filesystem element event corresponding to a particular filesystem element on the computing resource associated with the first tenant, the filesystem element event data describing a change to the particular filesystem element on a filesystem of the computing resource associated with the first tenant, and the filesystem element data including metadata of the particular filesystem element;
allocating the filesystem element event data to one of a plurality of parallel processing queues based upon an identifier of the computing resource;
determining that the filesystem element event corresponds to a deletion event;
responsive to determining that the filesystem element event corresponds to the deletion event, searching an event database for a last filesystem element event corresponding to that filesystem element and extracting a filesystem element signature including a hash of content of the particular filesystem element;
adding the filesystem element signature to the filesystem element event data to create enhanced filesystem element event data;
storing the enhanced filesystem element event data in a database record of the event database in a partition configured to store a history of filesystem element events of a plurality computing resources associated with the first tenant;
receiving a search request from a second computing device to search the event database, the search request comprising a search query and a tenant identifier of a second tenant;
executing the search query on a second partition of the event database to identify records that satisfy the search query, the second partition configured to store a history of filesystem element events of a plurality of computing resources associated with the second tenant; and
providing the identified records in response to the search request.

14. The machine-readable medium of claim 13, wherein the metadata of the particular filesystem element comprises at least one of: a filename, a filepath, a timestamp, a file size, a checksum, or a file type.

15. The machine-readable medium of claim 13, wherein the operations of allocating the filesystem element event data to one of the plurality of parallel processing queues comprises allocating the filesystem element event data to a processing queue based on a network identifier of the computing resource.

* * * * *